July 29, 1941.   G. F. BAHR   2,250,565
BUMPER GUARD
Filed June 27, 1939
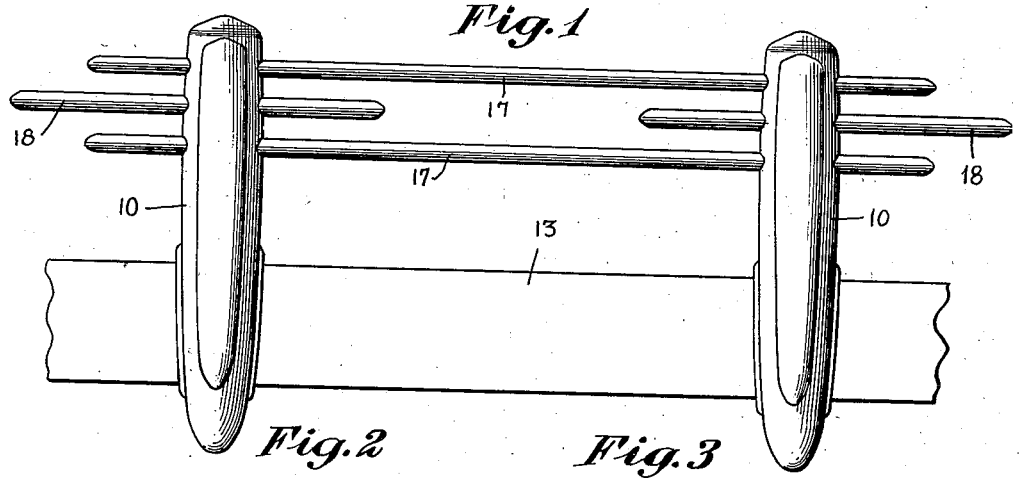
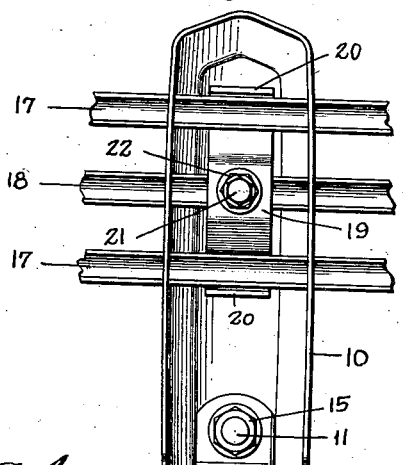
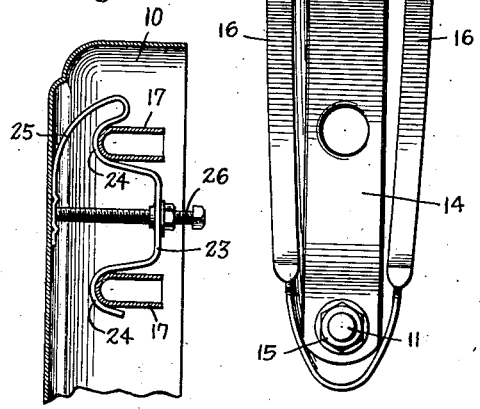
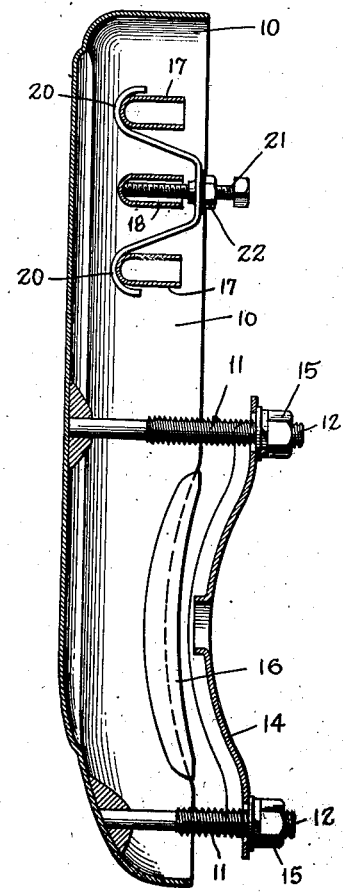
INVENTOR
Gustave F. Bahr
BY
*Johnson, Klarr & Smyth*
ATTORNEYS Patented July 29, 1941

2,250,565

UNITED STATES PATENT OFFICE 2,250,565

BUMPER GUARD

Gustave F. Bahr, Bridgeport, Conn., assignor, by mesne assignments, to American Chain & Cable Company, Inc., New York, N. Y., a corporation of New York Application June 27, 1939, Serial No. 281,346

9 Claims. (Cl. 293—55)

This invention relates to a bumper device, and, more particularly, to a guard for attachment to the bumper of a vehicle to increase the vertical area thereof.

The interengagement of the bumpers of colliding automobiles is not at all uncommon, notwithstanding the rather prevalent use of small vertical members attachable to the bumper to increase the vertical area thereof. These small members are now generally standard equipment, and, although they do increase somewhat the vertical area protected by the usual horizontal bumper, they, nevertheless, do not afford adequate protection particularly for the present day radiator grilles and other parts of the body which are located adjacent the front of the vehicle.

There have been proposed heretofore various means in addition to the small vertical members for protecting the radiator grilles and other contiguous portions of the present day motor vehicles. These means have generally consisted of members adapted to be clamped to the usual bumper at the medial point and extend upwardly therefrom to present a guard disposed in front of the grille. These guards have taken various designs, and, although many of them are pleasing to the eye, when detached, it has been found that a large number of them do not or cannot be made to harmonize with the design of the grille of the vehicle when they are attached to the bumper.

New car manufacturers are expending considerable time and money toward perfecting the design of the bodies of the present day motor vehicles, and, inasmuch as the grille plays a very important part in the design of the vehicle, car manufacturers attempt to make the grille as pleasing to the eye as possible. The use of unsightly grille guards, or grille guards which do not harmonize with the design of the grille, nullify, in many instances, the very pleasing design of the grille created by the designers of the vehicle.

The present invention comprises a guard adapted to be clamped to the usual bumper and which when clamped thereto will extend upwardly therefrom and afford adequate protection for the grille. The design of the herein disclosed guard is capable of being readily changed so that the design of the guard can be made to harmonize with the design of the grille which it is to protect.

The guard comprises a pair of standards which can be adjustably clamped in a vertical position to the usual bumper bar. A plurality of horizontal members are adjustably supported by the pair of standards, and, as the arrangement and disposition of the vertical standards on the bumper bar, as well as the arrangement and disposition of the horizontal members relative to the vertical standards can be changed, the design of the guard as a whole can also be changed.

The use of the guard of the present invention obviates the necessity of destroying the pleasing design created by the car manufacturer by attaching to the bumper a guard which does not harmonize with the design of the grille and the body of the car.

The adjustability of the guard is not only important from the viewpoint of design, for the guard can be adjusted to protect a larger area if such protection is needed as the standards may be spaced apart on the bumper a distance equal to the length of the horizontal members.

Other features and advantages will hereinafter appear.

In the accompanying drawing:

Figure 1 is a front elevational view of one form of my guard shown attached to a fragmentary part of a bumper bar.

Fig. 2 is a rear elevational view of one of the standards of my invention with portions of the horizontal members broken away.

Fig. 3 is a sectional view, partly in elevation, showing the details of the clamp used to adjustably hold the horizontal members relative to the vertical standard.

Fig. 4 is a fragmentary sectional view showing a modified form of my invention.

The device of the present invention, referring now to Fig. 1, comprises a pair of standards or vertical guard members 10 preferably formed by a stamping operation during which they may be given any desired longitudinal contour or configuration as well as surface decoration. To increase the strength of the standards, preferably they are formed substantially channel-shaped in cross section. Secured within the channel of each standard, as shown in Fig. 3, are a pair of spaced bolts 11. Each bolt 11 has a head portion secured to the rear wall of the standard, as by spot welding or the like, and is provided with threads 12 at the opposite end thereof.

To secure the standards to the bumper bar 13, a clamping plate 14 is provided with spaced apertures to receive the threaded ends of the bolts 11 after the standard has been placed against the impact face of the bumper bar 13. The clamping plate 14 is placed on the rear face of the bumper bar and the threaded ends of the bolts 11 extend rearwardly of the plate sufficiently to take the nuts 15 which, when pulled up tight, securely clamp the bumper bar 13 between the rear edges of the standards 10 and the plate 14.

Shims 16 preferably comprising channel-shaped members of rubber or the like can be slipped over the rear edges of the channel-shaped standards so that the same will not mar or scratch the impact face of the bumper bar 13 when the standards are secured thereto.

The side walls of each of the standards are provided with a plurality of aligned apertures adjacent the upper extremity thereof adapted to slidably receive a plurality of elongated horizontal guard members 17. The guard members 17 also are preferably stamped and may be given any configuration desired, although, as shown in Fig. 3, they are channel-shaped in cross section. The apertures formed in the side walls of the standards 10 are substantially of the same cross-sectional shape as the guard members 17 and are of a size sufficient to allow the guards to be slipped therethrough.

Any number of horizontal guards 17 may be employed, and I have shown in Fig. 1, a pair of horizontal guards supported at opposite ends on the standards 10 and a pair of intermediate guards 18 substantially shorter than the guards 17 supported intermediate their ends by each of the standards 10.

To hold the guards in any desired position, I employ a novel improved clamp 19 which when tightened securely holds the plurality of guards in the desired position. The clamp 19, referring particularly now to Fig. 3, consists of a U-shaped strap member having the ends of the legs thereof reversely bent to form hook-like members 20. The bow of the strap or clamp 19 is provided with an aperture which is tapped to provide screw threads to take a threaded bolt 21. The hook members 20 of the clamp are disposed about the front face of the upper and lower guards, as shown, and the bolt 21 is threaded into the aperture formed in the bow of the clamp until the end thereof engages the rear face of the intermediate guard. The bolt may then be turned until the end thereof tightly bears against the rear face of the intermediate guard and the hook members 20 of the clamp 19 tightly bear against the front faces of the upper and lower guards 17.

It will be seen that the clamp, when the bolt 21 is tightened as above described, will urge the outer horizontal guard members 17 rearwardly while the bolt 21 will urge the intermediate or short guard member 18 forwardly. The outer guard members 17 are, therefore, clamped against the rear walls of the apertures and the intermediate guard 18 is clamped against the front wall of the apertures. The clamp will securely hold the three guards shown in any position desired relative to the standard, but yet, by simply threading back the bolt 21, the clamp may be loosened sufficiently to allow the horizontal guards 17 and 18 to be slidably adjusted to any other desired position relative to the standard as well as each other.

A lock nut 22 is disposed between the head of the bolt and the apertured bow of the clamp for holding the bolt in the desired position relative to the clamp.

In use, the two standards 10 may be clamped in any desired position to the bumper bar 13, and, as the horizontal guards 17 have a sliding fit in the apertures of the standards 10, the latter may be moved toward or away from each other if desired. The standards 10 might be clamped to the bumper bar, as shown in Fig. 1, the upper and lower horizontal bars adjusted to the position shown, and the intermediate bar moved to the position wherein the one end thereof projects outwardly from the adjacent ends of the upper and lower bars and then the bolt 21 tightened to hold the bars in that position.

It will be seen that a large number of different designs might be effected by merely changing the relative positions of the horizontal guard members. The guard members need not be carried by the standards in the relationship shown, for the upper guard member 17, for example, might be removed entirely and slipped through the intermediate apertures after the intermediate guards 18 have been removed which can then be disposed in the upper apertures.

The standards 10 may be attached to the bumper and then the horizontal members changed until a design is obtained which will harmonize with the design of the front of the vehicle.

The bumper guard, furthermore, as it can be adjusted affords a means for changing the area protected. The standards, for example, might be moved apart substantially equal to the length of the horizontal members 17 if it was desired to protect an area extending a considerable distance to the left and right of the longitudinal axis of the vehicle.

It will be further seen that it would not be necessary to use both standards, as a single standard only can be used, which standard would then support all of the horizontal guard members employed. The use of only one standard, however, would not lend itself to the multiple designs which can be effected through the use of the pair of standards.

I have shown, in Fig. 4, a modified form of my invention used where it is desired to employ only two horizontal guard members. In this form of the invention, a pair of apertures are provided in the side walls of the channel-shaped standard, which apertures are of a size to slidably receive a pair of the horizontal guard members. The clamp in this modification comprises a U-shaped metal strap 23 having each opposite leg formed with a reversely bent portion 24, the one reversely bent portion 24 being again reversely bent and continued to form the tail 25. The bow of the U-shaped strap is provided with a threaded aperture adapted to take a bolt 26. The clamp is disposed, as shown in the figure referred to, and the hook-like portions, formed by the reverse bends 24, receive the front faces of the horizontal guard members and the bolt 26 is threaded through the clamp until the end thereof tightly engages the tail 25 which is clamped against the rear face of the channel-shaped standard. The bolt, when tightened, will urge the two horizontal guard members rearwardly and securely clamp the same against the rear wall of the apertures through which they extend. The clamp will securely hold the guard members in the desired position, but yet will allow the same to be changed if desired.

The standard of this modification of the invention is secured to the bumper bar 13 of the vehicle in the same manner as are the standards illustrated in Figs. 1 to 3.

Variations and modifications may be made within the scope of this invention and portions of the improvements may be used without others.

I claim:

1. A device of the type described comprising in combination a bumper; a pair of vertical guard members adapted to be supported by said bumper in spaced relation and extending upwardly therefrom; a plurality of horizontal guard members, the vertical guard members being provided with a plurality of spaced apertures adapted to receive the horizontal guard members whereby the same are supported by the vertical guard members in substantial parallelism with said bumper; and frictional clamping means for releasably clamping the horizontal guard members to said vertical guard members, said means permitting the relative position of all members to be changed so that the design of the device can be changed; said clamping means in each vertical guard member urging the rear surface of at least one of said horizontal guard members into frictional engagement with the sides of said apertures.

2. A bumper guard for vertical attachment to a bumper bar of a motor vehicle comprising a channel-shaped member, each side wall thereof having a plurality of apertures in alignment with a like number of apertures in the other side wall; a like number of horizontal members slidably extending through said aligned apertures and supported by said guard; and frictional clamping means within the channel for locking said horizontal members in any desired position of adjustment, said clamping means in each channel urging the rear surface of at least one of said horizontal members into frictional engagement with the rear side of said apertures.

3. A device of the type described comprising in combination a bumper; a pair of vertical guard members adapted to be supported by said bumper in spaced relation and extending upwardly therefrom, each of said vertical guard members being substantially channel-shaped in cross section, the side walls of the channels being provided with a plurality of aligned apertures; a like number of horizontal guard members of substantially the same cross-sectional shape as said apertures having the opposite ends thereof adjustably held therein; and frictional clamping means for locking the opposite ends of said horizontal members in said apertures, said clamp means comprising a metallic strap carried by said horizontal members and disposed within the channel of each vertical guard member.

4. A device of the type described comprising in combination, a bumper; a pair of vertical guard members adapted to be supported by said bumper in spaced relation and extending upwardly therefrom, each of said vertical guard members being substantially channel-shaped in cross section, the side walls of the channels being provided with a plurality of aligned apertures; a like number of horizontal guard members of substantially the same cross-sectional shape as said apertures adjustably held therein; a U-shaped clamp; hook-like members carried by the legs of said U for engaging the front faces of at least two of said horizontal guard members; and a bolt carried in threaded relation by said clamp adapted to engage the rear face of another of said horizontal guard members, said clamp when the bolt is tightened securely holding the horizontal members by friction in a desired position.

5. In combination with a channel member having a plurality of oppositely aligned apertures in each side wall thereof, said aligned apertures being of similar size and shape, and a plurality of transverse members slidably extending through the aligned pairs of apertures, the cross section of said transverse members corresponding to the shape of the apertures through which they extend, a U-shaped clamp comprising hook-like members carried by the legs of said U for engaging two of said transverse members on their faces facing the inner surface of said channel member; and a bolt threaded through the yoke of said clamp adapted to engage the inner wall of said channel member, said clamp securely holding the transverse members by friction in a desired psition when the bolt is tightened.

6. In combination with a channel member having a plurality of oppositely aligned apertures in each side wall thereof, said aligned apertures being of similar size and shape, and a plurality of transverse members slidably extending through the aligned pairs of apertures, the cross section of said transverse members corresponding to the shape of the apertures through which they extend, a U-shaped clamp comprising hook-like members carried by the legs of said U for engaging two of said transverse members on their faces facing the inner surface of the channel member; and a bolt threaded through the yoke of said clamp adapted to engage the opposite face of a third transverse member positioned intermediate the aforesaid pair of transverse members, said clamp securely holding the transverse members by friction in a desired position when the bolt is tightened.

7. In a bumper construction the combination with a horizontal bumper bar, a vertical guard supported on said bumper bar, said guard being apertured to receive a horizontally extending guard member, a guard member in the aperture of said vertical guard, and frictional clamping means cooperating with said vertical guard member and said horizontal guard member to urge the rear surface of said horizontal guard member into engagement with the rear side of the aperture in said vertical guard.

8. In a bumper construction the combination with a horizontal bumper bar, a vertical guard supported on said bumper bar, said guard being provided with rearwardly extending flanges having transversely aligned apertures to receive a horizontally extending guard member, and frictional clamping means bearing against the rear side of the front wall of said vertical guard and against the front face of said horizontal member for forcing said horizontal member into frictional holding engagement with the walls of said apertures.

9. In a bumper construction the combination with a horizontal bumper bar, a vertical guard supported on said bumper bar, said guard being provided with rearwardly extending flanges having pairs of aligned apertures to receive horizontally extending guard members, horizontally extending guard members supported in said apertures and frictional clamping means comprising a plate bearing against the front faces of said horizontal members and a bolt threaded through said plate adapted to engage the rear face of the front wall of said vertical guard, said clamp securely holding said horizontally extending members by friction in the desired position when the bolt is tightened.

GUSTAVE F. BAHR.